March 30, 1948. W. F. WILHELM ET AL 2,438,528
METHOD AND APPARATUS FOR MOLDING AND DRAINING CONCRETE
Filed Sept. 23, 1944 2 Sheets-Sheet 1
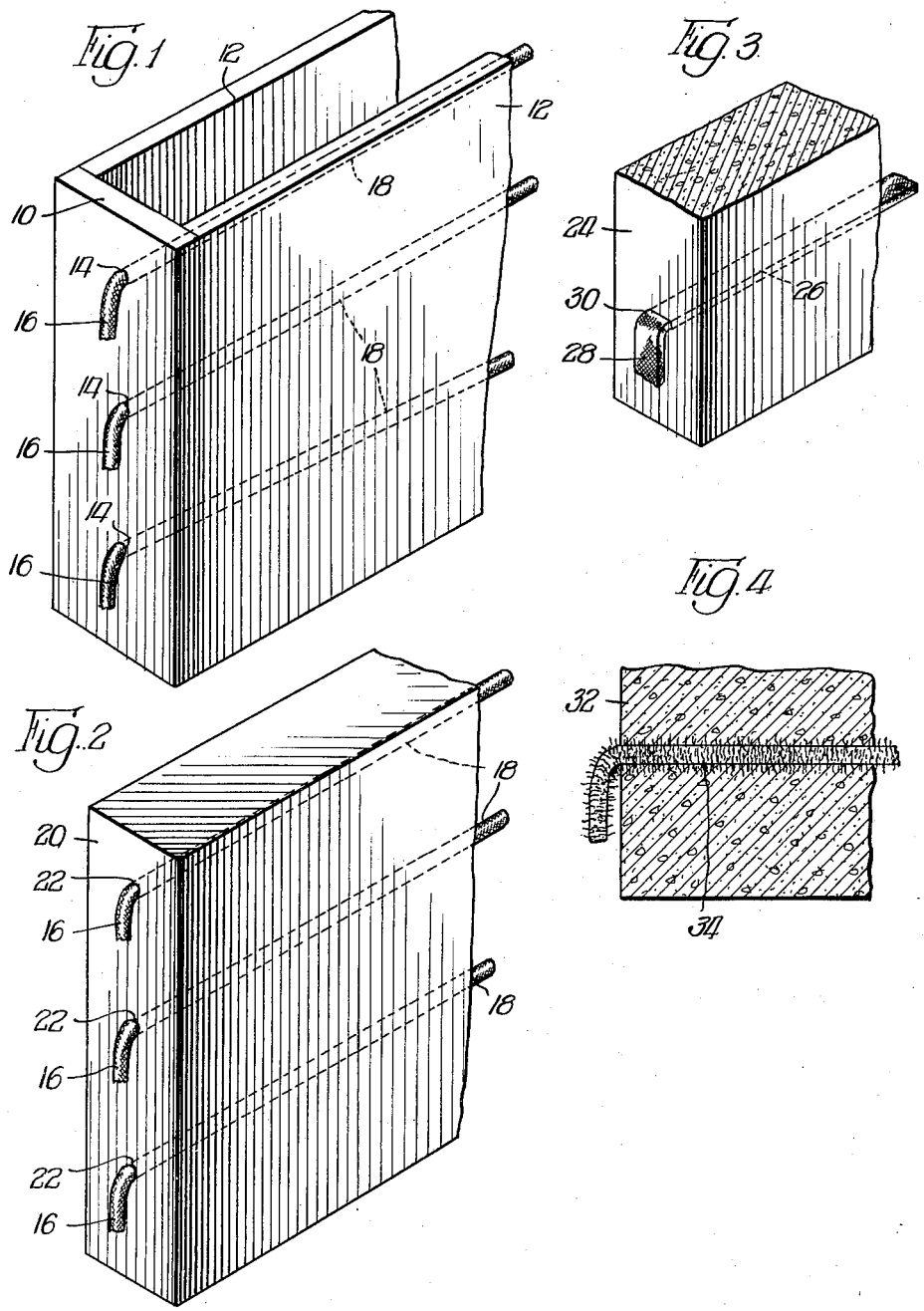
INVENTORS.
Warner F. Wilhelm.
BY Warren F. Wilhelm,
Wilkinson, Huxley, Byron & Knight
ATTYS March 30, 1948. W. F. WILHELM ET AL 2,438,528
METHOD AND APPARATUS FOR MOLDING AND DRAINING CONCRETE
Filed Sept. 23, 1944 2 Sheets-Sheet 2
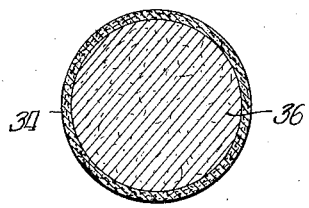
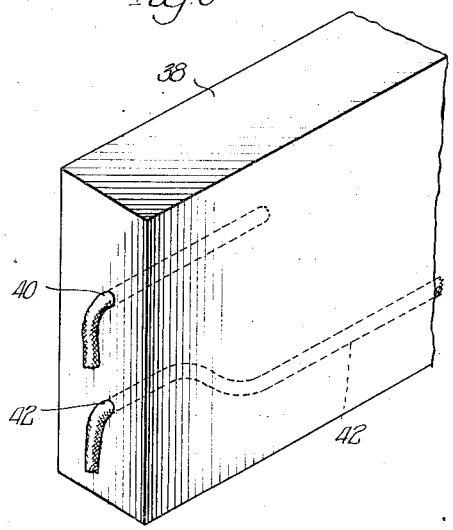
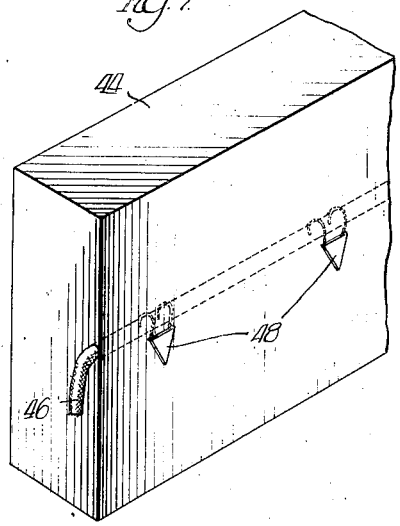
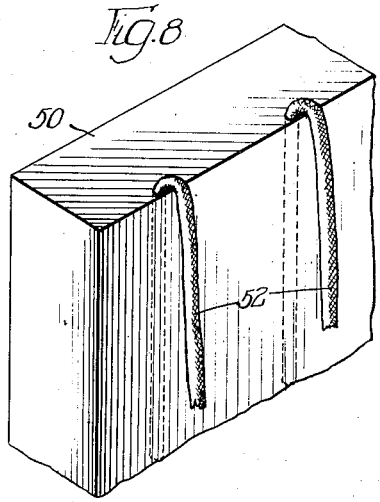
INVENTOR.
Warner F. Wilhelm,
BY Warren F. Wilhelm,
Wilkinson, Huxley, Byron & Knight
attys Patented Mar. 30, 1948

2,438,528

UNITED STATES PATENT OFFICE 2,438,528

METHOD AND APPARATUS FOR MOLDING AND DRAINING CONCRETE

Warner F. Wilhelm and Warren F. Wilhelm, Chicago, Ill.; said Warner F. Wilhelm assignor to said Warren F. Wilhelm Application September 23, 1944, Serial No. 555,415

4 Claims. (Cl. 25—131)

This invention relates to a new and improved means for forming concrete structures and more particularly to a novel means and method for accelerating the removal of the excess moisture or water from freshly poured concrete plastic mixtures.

In making concrete, the proper mixture of the usual ingredients such as sand, stone and other aggregates with the cement requires the use of a liberal amount of water in order to obtain a well mixed mass which is sufficiently plastic to be readily handled, poured or moulded in any way desired. While such use of water is essential to obtain proper mixtures and prepare the material for handling, it is desirable that the excess moisture or water used in the mixing process be removed as quickly as possible once the mass of material is placed in the desired form for setting.

It is common knowledge that setting of concrete requires considerable time before forms can be removed. The amount of time so required depends on such factors as thickness or depth of the material, atmosphere and similar conditions, which all have a direct bearing upon the drying of the material. Consequently, it is of essence that the excess water or moisture used in preparing the mixture be removed or drained with the least possible delay.

The extended use of concrete for numerous purposes has in many instances created additional problems in setting of the material. For example, in structures such as walls, which are usually of substantial height, the water contained in the freshly poured plastic mass has a tendency to settle quickly, thereby carrying with it the finer particles of the mixture causing strata of unequal texture resulting in varying the strength of the concrete. Settling or collecting of water likewise causes areas of weakness in the structures.

It is an object of this invention to provide means for facilitating the drainage or escape of excess water beginning relatively immediately, if desired, after the mass of plastic concrete has been placed in its permanent position, thereby preventing the usual collection or settling of water in certain areas with its resulting detrimental effect on the durability of the finished product.

It is a further object of this invention to manufacture concrete by the present method whereby the usual time needed for setting is greatly reduced.

The present invention employs a means of draining water from the mass of poured concrete by conduits which constitute rope-like strips made of a suitable pervious mass of material having absorption or adsorption qualities, such as cellulose products, rock wool, fibrous glass materials and the like, these conduits being of sufficient thickness to afford a substantial body when embedded in concrete. These strips may be placed substantially in the center of the freshly poured concrete at intervals which depend upon the particular requirements in each case, the ends being freely exposed through the forms which hold the concrete in place.

Since these strips are embedded in the mass of wet concrete, their highly absorptive character draws the water by capillary attraction from the mixture or the water may be drawn by a siphoning action which then proceeds to drain off through the strips, the ends of which are exposed through the end walls of the form. It has been found that the thickness of the strips employed and the distances at which they are spaced apart influence the rapidity with which this draining is effected. As an illustration, drains of approximately a half inch in diameter spaced at intervals approximately two feet apart would work effectively in an ordinary mixture used in constructing an average wall.

Another advantage derived from the use of this invention is that water drained from the cementitious material is filtered by passing through the draining strip without carrying off any of the particles of cement which form the basis of finally solidifying the mass. In the common setting process now in use, some of the valuable particles of cement are carried off by the settling of the water, resulting in weakening the structure in a corresponding degree.

These and other objects and advantages of the invention will be apparent from the following description and explanation and from the accompanying drawings in which:

Figure 1 is a view of a fragmentary section of a common concrete form showing the draining strips in place;

Figure 2 is a view of a fragmentary section of concrete wall with the form removed and showing draining strips in their embedded position;

Figure 3 is a fragmentary view of a section of concrete showing a modified form of the draining strip embedded therein;

Figure 4 is a cross-sectional view of a fragment of concrete having exposed therein a further modified form of the draining strip;

Figure 5 is a cross-sectional view of the draining conduit coated with a wetting agent;

Figure 6 is a fragmentary view of a section of concrete with draining strips embedded in different positions;

Figure 7 is a fragmentary view of a section of concrete showing the draining strip supported by attachments embedded within the concrete on one side and having the opposite side exposed evenly with the one wall of the concrete; and Figure 8 is a fragmentary view of a section of concrete with the draining strips placed vertically.

Referring first to Figures 1 and 2 of the drawings for a detailed description, the end enclosure of a set of concrete forms is designated as 10, and 12 represents the side wall enclosures thereof. End enclosure 10 is provided with openings 14 through which are exposed the free ends 16 of the draining strips 18. In Figure 2, the fragmentary section of concrete 20 is shown with the forms entirely removed. Draining strips 18 are shown embedded in the finished section of concrete with their free ends 16 exposed through the end of openings 22 which extend through the entire length of the concrete. These openings 22 are necessarily formed as a result of placing the draining strips in the forms at the time that the plastic mass of cementitious material is poured into the forms for setting.

Figure 3 illustrates a modification of the disclosures shown in Figures 1 and 2. A section of concrete 24 is shown having embedded therein a flat draining strip 26 exposing its free end 28 through opening 30. This is in all respects similar to the previous illustrations except that a flat draining strip is employed rather than the usual round or rope-like strips. Flat strips may be employed as desired in certain instances where such are more adaptable to particular requirements.

Figure 4 is a further modification illustrating a cross section of concrete 32 having exposed therefrom one end of draining strip 34. It will be noted that this draining strip employs considerable nap or short fibers throughout its length which renders the strip highly absorptive as these short fibers extend into the concrete and accordingly expose more draining surfaces to the moisture.

In Figure 5 is illustrated the draining strip or conduit 36 with an outer coating 34 made with a wetting agent which serves to expedite the drainage of the water through the conduit as it passes through this coating.

It has also been found desirable in some instances to expedite the draining of excess water from one section of the concrete as it is set, allowing another section to drain less rapidly.

In Figure 6 is shown a section of concrete 38 having a draining strip 40 disposed in the concrete throughout only a portion of its length. A further drainage strip 42 is shown disposed throughout the length of the concrete wall and embedded near the bottom thereof with its free end disposed upwardly from the main position. This allows the draining of moisture from the very bottom of the concrete mass and at the same time allows the conduit to drain through a portion above the main level of the conduit. It is, of course, understood that the exposed free end of the conduit or draining strip 42 is placed at a lower point than that of the main body of the strip within the concrete, thereby allowing for draining by capillary attraction or siphon action to the lowest point.

It has also been found that these draining strips can be attached to the inner walls of the forms on either or both sides. Figure 7 shows a fragmentary section of a section of concrete 44 with a draining strip 46 supported by attachments 48. These attachments can be made of wood or metal and when the form is ultimately removed after the setting of the concrete, they also serve as means for attaching fixtures, lathes, lumber, or the like.

Figure 8 shows a further modified form of a section of concrete with the draining strips or conduits embedded vertically in the concrete. By so disposing the conduits or draining strips the pouring of concrete is simplified in that they hang downwardly in the forms and will not be easily broken or displaced when the concrete is poured since the free ends hang over the outside of the form and below the lowest portion of the strips. Capillary attraction will also serve to draw off the excess water in this fashion.

In preparing forms for the concrete, the usual procedure can be employed in addition to which holes should be provided at the ends of such forms or at such other places as are suitable. These holes should, of course, be limited to a diameter or size substantially equal to that of the strips to be employed. Since concrete mixture is heavy and the strips are of a light construction due to the cellulose pervious material or other material of which they are made, it is desirable to place them in the forms as they are filled. The usual procedure would be to pour a layer of plastic concrete into the forms up to the height of the holes provided in the forms. Then the draining strips are placed upon this concrete and each end is exposed through the openings provided therefor at the ends of the forms.

Having thus placed the first draining strips, additional concrete is poured to the desired predetermined height where additional holes are provided in the forms and the same process is repeated. This procedure is then duplicated as often or as required to afford sufficient drains for the particular demands of the unit being constructed.

Once the concrete has hardened to its desired strength and the forms have been removed, the free ends of the draining strips may be cut off slightly within from the outer surface of the concrete and the openings can be closed by filling them with a small mixture of cement or other material.

It is also contemplated that the draining strips may be chemically or otherwise treated prior to being embedded in the concrete whereby they can be burned or otherwise dissolved after the draining has been completed and the strips dried. This would leave conduits in the walls which could be used for electric cables, pipes or similar equipment. Convenient outlets could be provided at intervals to tap the cables or pipes for any desired use.

While we have herein described and upon the drawings shown an illustrative embodiment of the invention, it is to be understood that the invention is not limited thereto but may comprehend other constructions, arrangements of parts, details and features without departing from the spirit of the invention.

What is claimed is:

1. Apparatus for forming structural elements, comprising one or more forms providing a space within the same to receive a body of plastic concrete and at least one body of pervious material disposed within and communicating with the exterior of said one or more forms and adapted to be embedded within a body of plastic concrete disposed within said space, said body of pervious material comprising a rope-like drainage strip of cellulose, whereby water from said body of plastic concrete is disposed of exteriorly of said wall by passage through said drainage strip of pervious material, and means for supporting said drainage strip within said forms.

2. The method of forming concrete and similar bodies within a form from a plastic mix including a hydrating material and water in excess of that required for hydration setting comprising, embedding a portion of a strip of wick-like, water absorptive, cellulosic material having a capillary characteristic wholly within and in water absorptive contact with the body of plastic mix within the form with an end portion of the strip exposed to the atmosphere at the exterior surface of the said form, whereby to drain excess water from the mix.

3. A method of forming concrete structures, comprising the steps of providing a mold having an opening therein adapted to receive plastic concrete and being of the desired shape and size, incorporating within said mold a body of pervious and flexible material comprising a drainage strip, having drainage relationship with the exterior of said mold, causing a quantity of plastic concrete to be introduced into said mold in embedding relation to said body of pervious material, introducing successive drainage strips and additional quantities of plastic concrete, effecting dissipation of excess water by capillary attraction from said plastic concrete to the exterior of said mold through said bodies of pervious material, removing said mold after the plastic concrete has solidified.

4. A method of forming concrete structures, comprising the steps of providing a mold adapted to receive plastic concrete, incorporating within said mold a drainage strip of flexible, pervious material at a point away from and between the side walls of said mold, causing said drainage strip to have communication with the exterior of said mold, causing a quantity of plastic concrete to be introduced into said mold in embedding relationship to said flexible drainage strip whereby water is drained from said plastic concrete through said drainage strip by capillary attraction, removing said mold after the plastic concrete has solidified.

WARNER F. WILHELM.
WARREN F. WILHELM.

REFERENCES CITED

The following references are of record in the file of this patent:

UNITED STATES PATENTS

| Number | Name | Date |
|---|---|---|
| 1,368,109 | Buckhout | Feb. 8, 1921 |
| 2,296,553 | Heritage et al. | Sept. 22, 1942 |
| 2,175,895 | Hybinette | Oct. 10, 1939 |
| 2,167,200 | Dahlberg | July 25, 1939 |
| 399,064 | McLean | Mar. 5, 1889 |